(12) United States Patent
Ida et al.

(10) Patent No.: US 8,496,447 B2
(45) Date of Patent: Jul. 30, 2013

(54) MOTOR

(75) Inventors: Kiyoto Ida, Kyoto (JP); Masashi Hirayama, Kyoto (JP); Hiroyoshi Teshima, Kyoto (JP)

(73) Assignee: Nidec Corporation, Kyoto (JP)

( * ) Notice: Subject to any disclaimer, the term of this patent is extended or adjusted under 35 U.S.C. 154(b) by 316 days.

(21) Appl. No.: 12/974,007

(22) Filed: Dec. 21, 2010

(65) Prior Publication Data

US 2011/0150677 A1 Jun. 23, 2011

(30) Foreign Application Priority Data

Dec. 22, 2009 (JP) .................. 2009-290112

(51) Int. Cl.
*F04B 35/04* (2006.01)
*H02K 11/00* (2006.01)

(52) U.S. Cl.
USPC .................. 417/354; 417/423.7; 417/423.12

(58) Field of Classification Search
USPC .............. 417/354, 423.7, 423.12; 310/62–63, 310/67 R, 71
See application file for complete search history.

(56) References Cited

U.S. PATENT DOCUMENTS

| | | | |
|---|---|---|---|
| 5,914,832 A | 6/1999 | Teshima | |
| 2007/0194668 A1* | 8/2007 | Teshima et al. | 310/67 R |
| 2008/0007128 A1* | 1/2008 | Murakami et al. | 310/58 |
| 2008/0197728 A1* | 8/2008 | Loussert et al. | 310/71 |
| 2009/0047148 A1* | 2/2009 | Chen et al. | 417/354 |

FOREIGN PATENT DOCUMENTS

| | | |
|---|---|---|
| JP | 05-011779 U | 2/1993 |
| JP | 06-197489 A | 7/1994 |
| JP | 06-261490 A | 9/1994 |
| JP | 2000-060064 A | 2/2000 |
| JP | 2004-248393 A | 9/2004 |
| JP | 2008-121627 A | 5/2008 |

* cited by examiner

*Primary Examiner* — Charles Freay
(74) *Attorney, Agent, or Firm* — Keating & Bennett, LLP (57) ABSTRACT

In a motor, a bearing housing is made of a thermoplastic resin material. A bottom portion of the bearing housing includes a first large diameter portion, a small diameter portion, and a second large diameter portion. The first large diameter portion of the bearing housing is arranged on an upper surface of the base. An outer circumferential surface of the small diameter portion of the bearing housing is arranged radially opposite a side peripheral surface of a base hole. The second large diameter portion is arranged to be in direct contact with a lower surface of the base through caulking.

20 Claims, 5 Drawing Sheets

MOTOR

BACKGROUND OF THE INVENTION

1. Field of the Invention

The present invention relates to a motor and more specifically to a motor for use in an electric centrifugal fan that blows air.

2. Description of the Related Art

There are two types of blower fans: axial fans and centrifugal fans. In general, the axial fans have excellent air volume characteristics, while the centrifugal fans have excellent static pressure characteristics.

Excellent static pressure characteristics, rather than excellent air volume characteristics, are generally required for the purposes of cooling electronic devices, such as notebook computers, inside of which electronic components are densely packed. In particular, the centrifugal fans are generally chosen as small-sized blower fans which are used to cool the notebook computers.

Inside a housing of the centrifugal fan, an impeller portion including a plurality of blades is typically arranged on an outside surface of a hub which is in the shape of a covered cylinder and which defines a portion of a motor. The centrifugal fan is arranged to suction air in an axial direction, and discharge the air in a radial direction. The housing of the centrifugal fan typically includes a base to which the motor is fixed, a side wall which defines a channel for air, and a cover which is arranged to cover an upper end of the side wall.

In recent years, electronic devices, such as personal computers, have been becoming smaller and smaller. There is accordingly a demand for a reduction in size and thickness of the centrifugal fans.

In a related-art technique, locking claws are provided in a metallic frame, and a housing arranged to hold a bearing is engaged with the frame through the locking claws, for example.

In this technique of engaging the housing with the frame through the locking claws provided in the frame, however, the locking claws have to be arranged at regular intervals in a circumferential direction while having a wide radial spread on the frame. Because the wide radial spread of the locking claws on the frame is indispensable, a reduction in a radial dimension of the fan is limited.

Moreover, when a reduction in an axial dimension of the fan is aimed at by placing a circuit board as close to the frame as possible, the locking claws provided in the frame may come into contact with the circuit board, which then renders the circuit board unstable. In order to achieve a reduction in the axial dimension of the fan in conjunction with this related-art technique, ingenuity would be therefore required with respect to the shape and arrangement of the circuit board so as to prevent the circuit board from coming into contact with any locking claw provided in the frame.

SUMMARY OF THE INVENTION

A motor according to a preferred embodiment of the present invention preferably includes a shaft arranged to extend in a vertical direction, and having a central axis in a center thereof; a hub substantially in a shape of a covered cylinder, and arranged to be supported by the shaft; a magnet attached to an inside of the hub; a stator arranged radially opposite the magnet; a bearing mechanism including the shaft and a sleeve arranged to rotatably support the shaft; a bearing housing having a bottom and being substantially cylindrical, and arranged to accommodate the bearing mechanism; a base arranged near a bottom portion of the bearing housing, and including a base hole defined therein; and a circuit board arranged on an upper surface of the base. The bearing housing is preferably made of, for example, a thermoplastic resin material, and the bottom portion of the bearing housing includes a first large diameter portion, a small diameter portion, and a second large diameter portion. The first large diameter portion is arranged on the upper surface of the base. An outer circumferential surface of the small diameter portion is arranged radially opposite a side peripheral surface of the base hole. The second large diameter portion is arranged in contact with a lower surface of the base, and formed as a result of thermal caulking.

According to preferred embodiments of the present invention, motors having a simple structure and reduced size and which can be assembled with improved workability are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. Note that the terms "axial direction", "axial", and "axially" as used herein refer to a direction parallel or substantially parallel, to a central axis J, whereas the terms "radial direction", "radial", and "radially" as used herein refer to directions perpendicular or substantially perpendicular to the central axis J. Also note that it is assumed herein that a side on which a cover of a housing is arranged and a side on which a base of the housing is arranged in relation to each other are defined as an upper side and a lower side, respectively, along the central axis J. Note, however, that the central axis J may not necessarily be parallel to the direction of gravity in actual practice.

Figure 1:
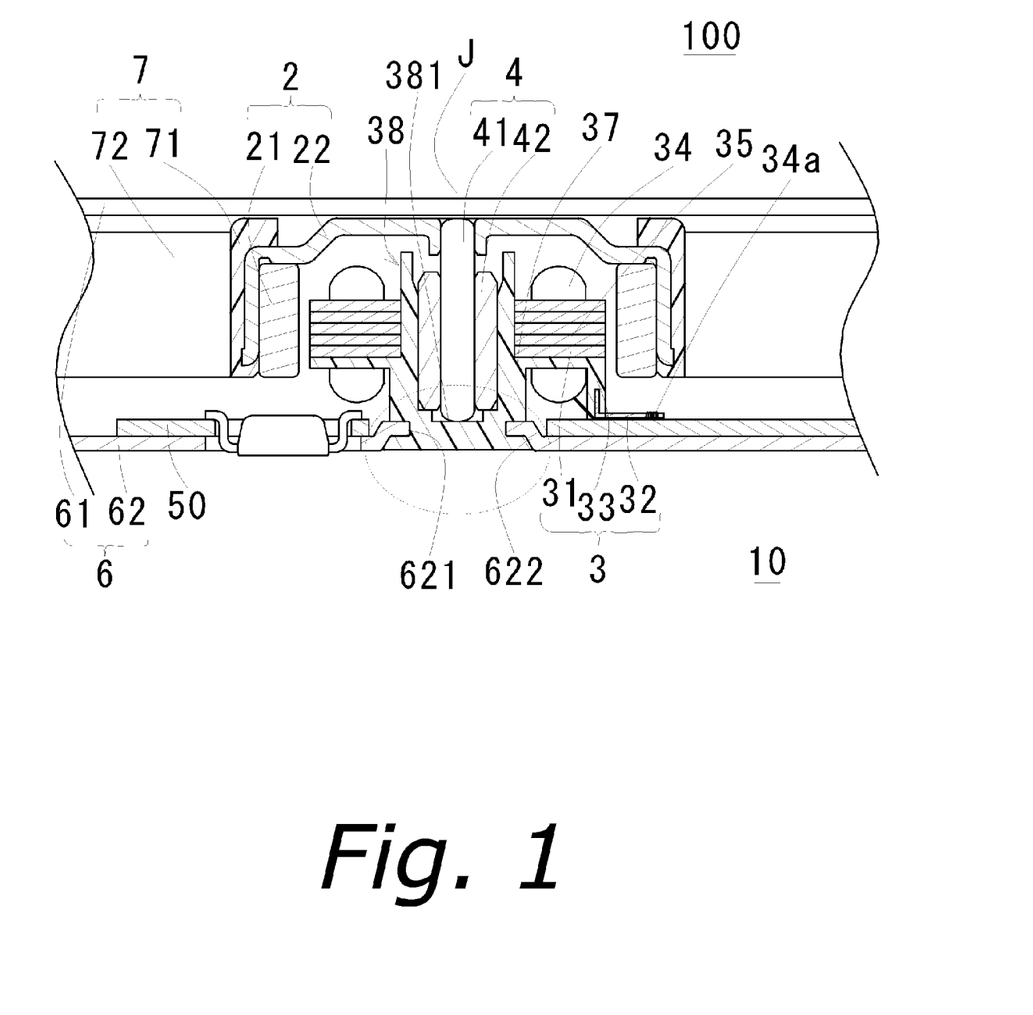
FIG. 1 is a schematic cross-sectional view illustrating the internal structure of a centrifugal fan according to a first preferred embodiment of the present invention.

FIG. 1 is a schematic partial cross-sectional view illustrating the internal structure of a centrifugal fan 100 including a motor 10 according to a preferred embodiment of the present invention, taken along a plane including the central axis J.

As illustrated in FIG. 1, the centrifugal fan 100 preferably includes an impeller 7, the motor 10, which is arranged to rotate about the central axis J, and a housing 6 arranged to accommodate the motor 10. The housing 6 preferably includes a cover 61 including a side wall, and a base 62 arranged to support the motor 10. The impeller 7 is preferably fixed to a rotor portion 2 of the centrifugal fan 100, and rotation of the impeller 7 introduces air into the housing 6, and discharges the air out of the housing 6 through an air channel inside the housing 6.

As illustrated in FIG. 1, the motor 10 preferably includes the rotor portion 2, which is a rotating body, and a stator portion 3, which is a stationary body. The rotor portion 2 is supported by a bearing mechanism 4 so that the rotor 2 is rotatable with respect to the stator portion 3. The rotor portion 2 preferably includes a field magnet 21 and a hub 22. The field magnet 21 includes multiple magnetic poles and preferably has an annular shape. The field magnet 21 is preferably inserted inside the hub 22 through an opening side of the hub 22, and fixed to an inside surface of the hub 22. The hub 22 which preferably includes a substantially cylindrical shape with a covered end is substantially centered on the central axis J, and arranged to open in the direction of the stator portion 3.

The impeller 7 is preferably attached to an outside of the hub 22. The impeller 7 preferably includes a substantially cylindrical impeller cup 71 and a plurality of blades 72, which are arranged on an outer circumferential surface of the impeller cup 71. The impeller cup 71 is preferably substantially cylindrical and centered on the central axis J. Since one of the advantages of preferred embodiments of the present invention is providing small-sized centrifugal fans, the diameter of the hub 22 is preferably about 35 mm or less, and more preferably about 20 mm or less, for example. The hub 22 is preferably inserted inside the impeller cup 71 and fixed to the impeller cup 71. The blades 72 are preferably arranged radially outside the hub 22 and in a substantially annular shape about the central axis J. An insert hole in which a shaft 41 of the bearing mechanism 4 is inserted is preferably defined substantially in the center of a cover portion of the hub 22. A fixed end (i.e., an end on an upper end of the rotor portion 2) of the shaft 41 is preferably inserted in the insert hole, such that the shaft 41 is fixed to the hub 22. The shaft 41 is preferably arranged to extend in a vertical direction, and is centered on the central axis J.

As illustrated in FIG. 1, the shaft 4 is preferably inserted inside a cylindrical sleeve 42, which is defined by an oil-bearing porous metal body. An end surface of the shaft 41 at a lower end thereof is arranged axially opposite a shaft receiving surface 381 of a bearing housing 38, and is supported by the bearing housing 38. The sleeve 42 is preferably inserted inside the bearing housing 38 and fixed thereto. The shaft 41 and the sleeve 42 together define the bearing mechanism 4. Because the bearing housing 38 includes a bottom and substantially a cylindrical shape, oil arranged inside the bearing mechanism 4 is prevented from leaking downward. The bearing mechanism 4 according to the present preferred embodiment preferably uses a sliding bearing.

Note that the bearing mechanism 4 may not necessarily be defined by a combination of the shaft 41 and the sleeve 42, but may alternatively be a bearing mechanism using a ball bearing or the like, for example. Also note that a thrust plate (not shown) may be arranged on an inside bottom surface of the bearing housing 38, at a position axially opposite the end surface of the shaft 41 on the free end thereof. The thrust plate preferably includes a low-friction synthetic resin material.

Figure 3:
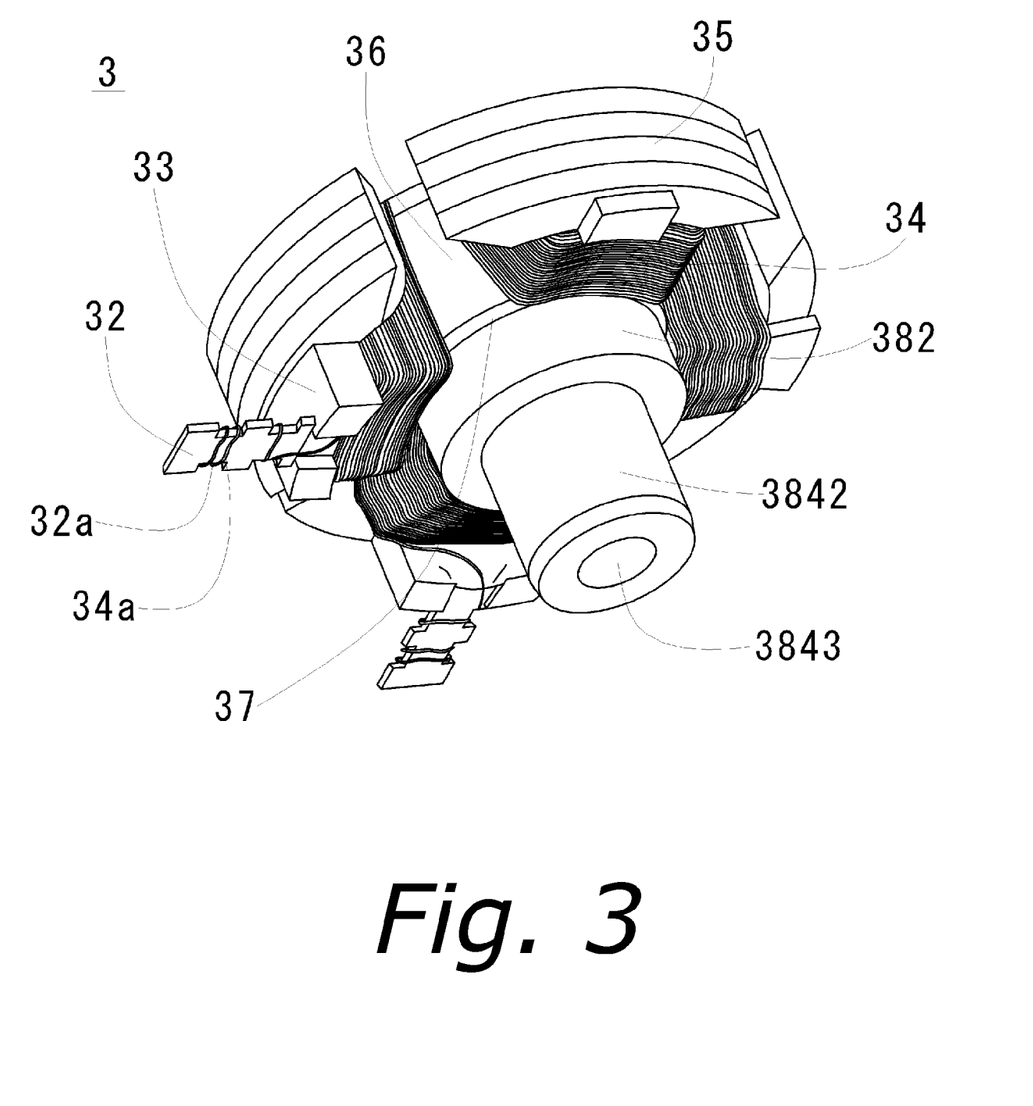
FIG. 3 is a schematic perspective view of a stator portion according to the first preferred embodiment of the present invention.

The stator portion 3 preferably includes a stator core 31, a plurality of terminal pins 32, and a plurality of support portions 33. The stator core 31 preferably includes a plurality of teeth 35 arranged to extend radially outward away from the central axis J. The terminal pins 32 are preferably arranged to extend radially outward away from the central axis J. Each of the terminal pins 32 is preferably arranged to be joined to a separate one of the support portions 33 through, for example, insert molding or outsert molding, such that the terminal pins 32 are held within the support portions 33. Referring to FIG. 3, in the present preferred embodiment, the teeth are portions of the stator core 31 which project radially outward from an outer circumferential portion of a core back 36, and around which lead wires are wound to define coils.

Lead wires are preferably wound around the teeth 35 to define coils 34. End portions 34a of the lead wires are preferably bound around the terminal pins 32 and electrically connected thereto.

A circuit board 50 is preferably arranged on an axially opposite side of the support portions 33 with respect to the stator core 31. The circuit board 50 is preferably arranged on an upper surface of the base 62. A lower end portion of each support portion 33 is preferably arranged in contact with the circuit board 50 and thus supported thereon. Each terminal pin is preferably electrically connected to a land portion (not shown) arranged on the circuit board 50 through soldering or other methods. Note that the circuit board 50 may have flexibility (for example, may be defined by a flexible printed circuit (FPC)) if so desired.

In the centrifugal fan 100, the timing of a supply of currents from the circuit board 50 to the stator core 31 is controlled to produce a torque (i.e., a turning force) centered on the central axis J between the field magnet 21 and the stator core 31, which is preferably arranged radially inward of (i.e., closer to the central axis J) and opposite the field magnet 21. That is, the field magnet 21 and the stator core 31 together define a drive mechanism. The impeller 7, which is fixed to the hub 22, is preferably arranged to thereby rotate in a predetermined direction together with the hub 22.

As illustrated in FIG. 1, the stator portion 3 is preferably attached to the base 62 of the housing 6 through the bearing housing 38. The bearing mechanism 4 is accordingly arranged to support the hub 22 such that the hub 22 is rotatable about the central axis J with respect to the housing 6.

Figure 2:
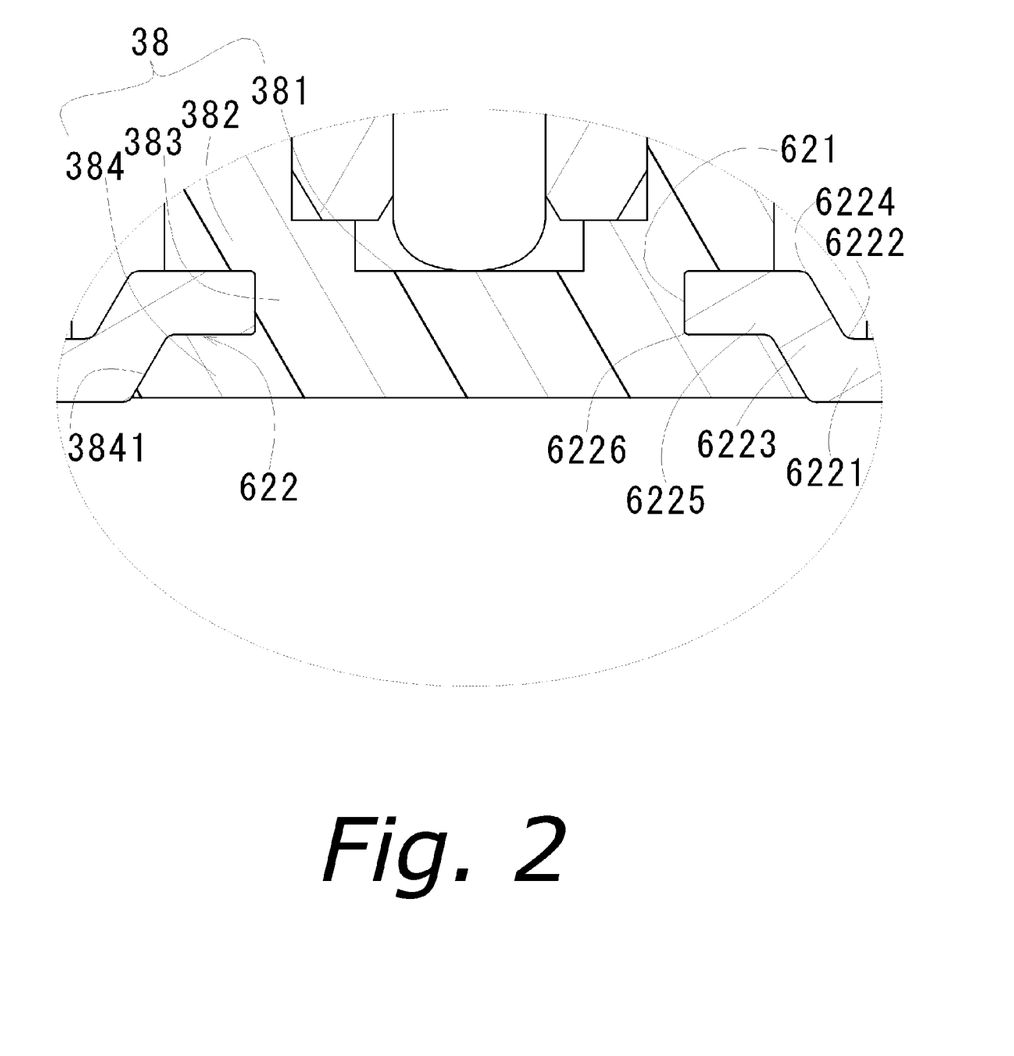
FIG. 2 is a schematic enlarged view illustrating an area enclosed by a broken line illustrated in FIG. 1.

Next, referring to FIGS. 1 and 2, a manner in which the bearing housing 38 is fixed to the base 62 will now be described in detail below. FIG. 2 is a schematic enlarged view illustrating an area enclosed by a broken line illustrated in FIG. 1. A bottom portion of the bearing housing 38 preferably includes a first large diameter portion 382, a small diameter portion 383, and a second large diameter portion 384. In addition, the base 62 preferably includes a base hole 621 defined therein to allow the bottom portion of the bearing housing 38 to be fixed thereto. The base 62 preferably further includes a protruding portion 622 arranged to bend axially upward from a lower flat portion 6221 to protrude above the lower flat portion 6221, and arranged around the periphery of the base hole 621. The protruding portion 622 preferably includes a lower bend portion 6222, a rising portion 6223, an upper bend portion 6224, an upper flat portion 6225, and a corner portion 6226. More specifically, the rising portion 6223 of the protruding portion 622 preferably rises axially upward and radially inward from the lower flat portion 6221 through the lower bend portion 6222. The upper flat portion 6225 preferably extends radially inward from the rising portion 6223 through the upper bend portion 6224 and parallel or substantially in parallel with the lower flat portion 6221. The corner portion 6226 preferably extends along a lower end of a radially inner circumferential surface of the upper flat portion 6225. The radially inner circumferential surface of the upper flat portion 6225 preferably defines the base hole 621.

A lower surface of the first large diameter portion 382 of the bearing housing 38 is preferably arranged in contact with an upper surface of the upper flat portion 6225 of the protruding portion 622 of the base 62. An outer circumferential surface of the small diameter portion 383 of the bearing housing is preferably arranged radially opposite a side peripheral surface of the base hole 621. The side peripheral surface of the base hole 621 preferably corresponds to the radially inner circumferential surface of the upper flat portion 6225. Note that the outer circumferential surface of the small diameter portion 383 of the bearing housing 38 may be spaced from the side peripheral surface of the base hole 621, but is preferably arranged in contact therewith. An upper surface of the second large diameter portion 384 of the bearing housing 38 is preferably arranged to cover and be in contact with a substantially entire lower surface of the upper flat portion 6225 of the protruding portion 622 of the base 62. As shown in FIG. 2, an outer circumferential surface 3841 of the second large diameter portion 384 of the bearing housing 38 is preferably arranged to cover and be in contact with a substantially entire "radially inner slanting surface" of the rising portion 6223 of the protruding portion 622. That is, the protruding portion 622 of the base 62 is preferably held between the lower surface of the first large diameter portion 382 and the upper surface of the second large diameter portion 384 of the bearing housing 38. Specifically, in the present preferred embodiment, thermal caulking is preferably applied as a method to fix the bearing housing 38 to the base 62. Here, "thermal caulking" refers to a method of simultaneously heating and applying pressure to a predetermined portion of a resin product to cause this portion to undergo heat deformation, thereby accomplishing a firm and secure fixture between the bearing housing 38 and the base 62. The circuit board 50 is preferably arranged such that no portion thereof extends over the upper surface of the upper flat portion 6225 or a radially outer slanting surface of the rising portion 6223 of the protruding portion 622. That is, an inner circumferential edge of the circuit board 50, which defines a central opening of the circuit board 50, is arranged radially outward of the lower bend portion 6222 of the protruding portion 622.

Note that, in the present preferred embodiment, the bearing housing 38 is preferably fixed to the base 62 at the periphery of the bottom portion of the bearing housing 38. This fixing method requires a relatively small radial space compared with a conventional method as described in JP-A 2008-121627 in which brim-shaped portions are provided in a lower end portion of a bearing housing, and these brim-shaped portions are preferably fixed to a base hole defined in a base. In other words, the fixing of the bearing housing 38 to the base 62 is accomplished within a small space, which contributes to reducing the size of the centrifugal fan 100. Moreover, the base 62, to which the bearing housing 38 is fixed, preferably includes the protruding portion 622 arranged to protrude axially upward, and no portion of the circuit board 50 extends over the upper surface of the upper flat portion 6225 of the protruding portion 622. In addition, the second large diameter portion 384 of the bearing housing 38 is preferably fixed to the lower surface of the upper flat portion 6225 of the protruding portion 622. The fixing of the bearing housing 38 to the base 62 is therefore accomplished within a small axial space, and this contributes to reducing the thickness of the centrifugal fan 100.

Figure 4:
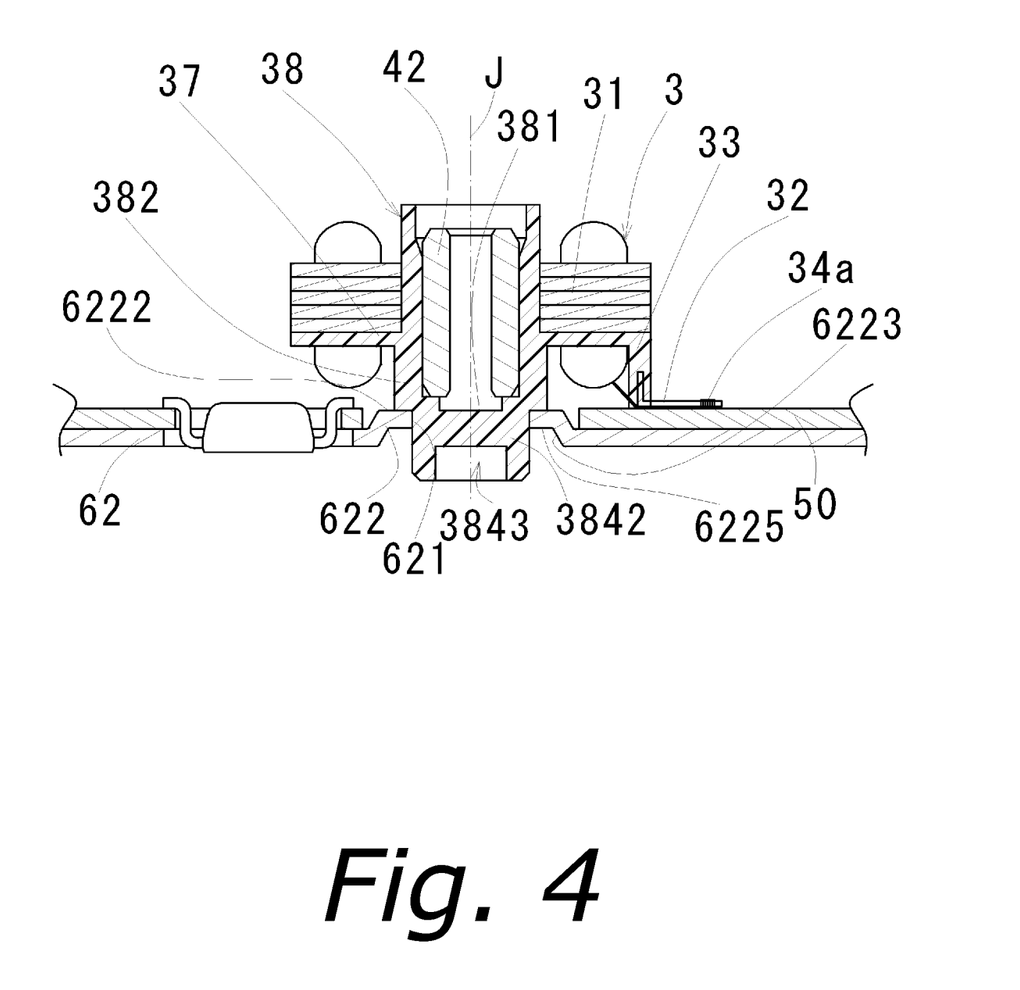
FIG. 4 is a schematic cross-sectional view of a motor according to the first preferred embodiment of the present invention during a manufacturing process thereof.

FIG. 3 is a schematic perspective view of the stator portion 3 according to the first preferred embodiment. FIG. 4 is a schematic partial cross-sectional view illustrating a method of fixing the stator portion 3 to the base 62. An exemplary method of fixing the stator portion 3 to the base 62 will now be described below.

First, the stator portion 3 is prepared. As illustrated in FIG. 3, the stator portion 3 preferably includes the stator core 31, the support portions 33, and the terminal pins 32. The support portions 33 are preferably joined together by a substantially annular joining portion 37. The bearing housing 38, which includes a bottom and is substantially cylindrical, is arranged inside an inner circumferential surface of the joining portion 37. The bottom portion of the bearing housing 38 preferably includes the first large diameter portion 382 and a tubular portion 3842. The tubular portion 3842 preferably includes a hole portion 3843 with an opening. The support portions 33, the joining portion 37, the bearing housing 38, and the tubular portion 3842 are preferably molded of the same material into a single piece, for example, but could be defined by separate pieces if so desired. Each of the support portions 33 is preferably made of a resin, for example. Also, each of the support portions 33 and a separate one of the terminal pins 32 are preferably joined to each other through insert molding or outsert molding, for example.

In the present preferred embodiment, the resin used is preferably a thermoplastic resin, for example. More specifically, preferably a liquid crystal polymer (a liquid crystal polyester resin) is used. To mention articles available on the market, "Rodrun(R) LC-5030G", produced by Unitika, Ltd., "UENO LCP(R) 2030G", produced by Ueno Fine Chemicals Industry, Ltd., or the like may be used. Liquid crystal polymers are suitable as materials of components of which high rigidity and precision are required. Because the bearing housing 38 according to the present preferred embodiment is made of a liquid crystal polymer, the bearing housing 38 is able to achieve reduced size and thickness while also having sufficiently high precision and rigidity to hold the bearing mechanism 4. The liquid crystal polymer is therefore a suitable material for the bearing housing 38.

The stator core 31 preferably includes the teeth 35 arranged to extend radially outward away from the central axis J. The teeth 35 are preferably joined together by the core back 36, which preferably includes a substantially annular shape. The thickness of the stator core 31 is preferably in the range of about 0.2 mm to about 2 mm, for example. The stator core 31 is preferably defined by several electromagnetic steel sheets laminated one upon another.

Upper and lower surfaces of the stator core 31 are preferably coated with electrically insulating films (not shown). The electrically insulating films are preferably formed by electrodeposition, powder coating, or the like so that the insulating films will have a small thickness in the range of about 0.02 mm to about 0.2 mm, for example.

The thickness of each support portion 33 is preferably about 0.3 mm or less, for example. In addition, each terminal pin 32 is preferably defined by a metal sheet, and preferably includes a thickness of about 0.2 mm or less, for example.

As illustrated in FIG. 3, the lead wires are preferably wound around the teeth 35 to define the coils 34. Each terminal pin 32 preferably includes a decreased width portion 32a around which an end portion 34a of a corresponding one of the lead wires is bound. Inclusion of the decreased width portion 32a in the terminal pin 32 makes it easy to bind the end portion 34a of the lead wire around a desired portion of the terminal pin 32. Furthermore, the inclusion of the decreased width portion 32a in the terminal pin 32 and the binding of the end portion 34a of the lead wire around the decreased width portion 32a contribute to restricting a radially inward or outward movement of the end portion 34a of the lead wire, thereby securing the end portion 34a of the lead wire.

Next, referring to FIG. 4, the base 62, which is preferably made of a metallic material, and the circuit board 50 fixed to the base 62 are prepared. The base 62 and the stator portion 3 are preferably arranged to be substantially concentric and brought into contact with each other. This can be accomplished by inserting the tubular portion 3842 of the bearing housing 38 into the base hole 621 until an appropriate fit is achieved, such that an outer circumferential surface of the tubular portion 3842 travels along the side peripheral surface of the base hole 621. This insertion step is preferably completed when the lower surface of the first large diameter portion 382 of the bearing housing 38 of the stator portion 3 is brought into contact with the upper surface of the upper flat portion 6225 of the protruding portion 622 of the base 62. Note that, in a subsequent step, the terminal pins 32 are electrically connected to the circuit board 50, preferably through soldering. In preparation for this step, the terminal pins 32 and the land portions on the circuit board 50 are preferably aligned in an axial direction during the insertion step. Here, the outside diameter of the tubular portion 3842 of the bearing housing 38 may be arranged to be slightly greater than the diameter of the base hole 621 so that the tubular portion 3842 are press-fitted to the base 62 with application of a slight force. This dimensional design enables the bearing housing 38 to be temporarily fixed to the base 62. The outside diameter of the first large diameter portion 382 is greater than the diameter of the base hole 621. The tubular portion 3842 preferably includes a diameter smaller than the diameter of the first large diameter portion 382. Although the outside diameter of the tubular portion 3842 which is slightly greater than the diameter of the base hole 621 enables the press fit with application of the slight force as described above, the outside diameter of the tubular portion 3842 may be arranged to be substantially equal to or smaller than the diameter of the base hole 621.

Next, the stator portion 3 is preferably fixed to the base 62 through thermal caulking, for example. Specifically, a heated "heating jig" is preferably applied onto a bottom surface of the tubular portion 3842 of the bearing housing 38. At this time, it is preferable to secure the stator portion 3 and the base 62 by temporarily using a jig that is used solely for securing purposes. Fixing the tubular portion 3842 in relation to the protruding portion 622 while securing the stator portion 3 and the base 62 contributes to ensuring perpendicularity. The protruding portion 622 of the base 62, which is preferably made of a metal, is preferably formed by press working, for example.

A pressure is preferably applied with the heating jig to an entire circumference of a heated bottom portion of the tubular portion 3842 such that the bottom portion of the tubular portion 3842 will be spread radially outward. The tubular portion 3842 is thus thermally deformed to be spread substantially throughout the entire lower surface of the upper flat portion 6225 and the entire radially inner slanting surface of the rising portion 6223 of the protruding portion 622 of the base 62. Referring to FIG. 2, a portion of the tubular portion 3842 defines the second large diameter portion 384 after being thermally deformed and cooled, whereby the effect of caulking is achieved. Meanwhile, a portion of the tubular portion 3842 which preferably occupies the base hole 621 defines the small diameter portion 383. As illustrated in FIGS. 3 and 4, the hole portion 3843, which preferably includes a bottom and is substantially cylindrical, is defined in a center of the tubular portion 3842. The shaft receiving surface 381 and the bearing mechanism 4 are preferably arranged axially above the hole portion 3843. The shaft receiving surface 381 is preferably positioned higher in an axial direction than the lower surface of the upper flat portion 6225 of the protruding portion 622. An inside bottom portion of the tubular portion 3842 is preferably arranged to be substantially flush with a lower surface of the lower flat portion 6221. Provision of the hole portion 3843 contributes to inhibiting fluidity of the resin caused by heat during the heat deformation step from affecting the bearing mechanism 4. To be more specific about the fluidity of the resin of the tubular portion 3842 caused by the heat, the heat preferably spreads from the bottom portion of the tubular portion 3842, onto which the heating jig is applied, such that the entire tubular portion 3842 is thermally deformed. The thermally deformed tubular portion 3842 consequently collapses to spread radially outward, with the corner portion 6226 of the protruding portion 622 serving as a support. This preferably results in the resin of the tubular portion 3842 substantially filling a space enclosed by the lower surface of the upper flat portion 6225, the radially inner slanting surface of the rising portion 6223 of the protruding portion 622, and an extension of the lower surface of the lower flat portion 6221. The resin of the tubular portion 3842 is thereby adhered to the base 62, without a flow of the resin of the thermally deformed tubular portion 3842 affecting the position of the shaft receiving surface 381 or the precision of the bearing mechanism 4. Note that a set temperature of the heating jig may be any temperature that, for example, causes the tubular portion 3842 to be thermally deformed. Also note that the heating jig may be in any shape as long as the heating jig can be brought into substantially planar contact with the bottom surface of the tubular portion 3842 of the bearing housing 38. The heating jig may have a smooth curved surface with a central depression, for example.

In the present preferred embodiment, a thermally deformed portion 3841 of the tubular portion 3842 is preferably arranged to fill the aforementioned space under the protruding portion 622 of base 62, that is, the space enclosed by the lower surface of the upper flat portion 6225, the radially inner slanting surface of the rising portion 6223, and the extension of the lower surface of the lower flat portion 6221. That is, the volume of the thermally deformed portion 3841 of the tubular portion 3842 is preferably substantially equal to or smaller than the volume of the aforementioned space. The thermally deformed portion 3841 of the tubular portion 3842 defines the second large diameter portion 384 as illustrated in FIG. 2. The base 62 being made of a metal makes it possible to reduce the thickness of the base 62. Moreover, because no portion of the circuit board 50 extends over the upper surface of the upper flat portion 6225 of the protruding portion 622, it is possible to reduce the axial dimension of a portion of the bearing housing 38 which contributes to fixing the bearing housing 38 to the base 62. This in turn leads to a reduction in the thickness of the centrifugal fan 100.

Next, the stator portion 3 and the circuit board 50 are electrically connected to each other. As illustrated in FIG. 3, the end portions 34a of the lead wires have previously been secured to the terminal pins 32. The electrical connection between the stator portion 3 and the circuit board 50 is therefore achieved simply by, for example, placing each terminal pin 32 on the corresponding land portion thereof on the circuit board 50, and soldering the terminal pin 32 to the land portion. This soldering operation can be easily and securely achieved without any problems, such as a displacement of any lead wire 34 or a broken wire.

As described above, each of the support portions 33, which are preferably arranged to support the terminal pins 32, is made of a liquid crystal polymer, for example. The liquid crystal polymer is more highly heat-resistant than versatile resins. Each support portion 33 is therefore unlikely to undergo heat deformation even if heat applied during the soldering operation is transmitted to the support portion 33 through the terminal pin 32. A problem such as the terminal pin 32 coming off the support portion 33 due to a thermal deformation of the support portion 33 is therefore unlikely to occur.

Figure 5:
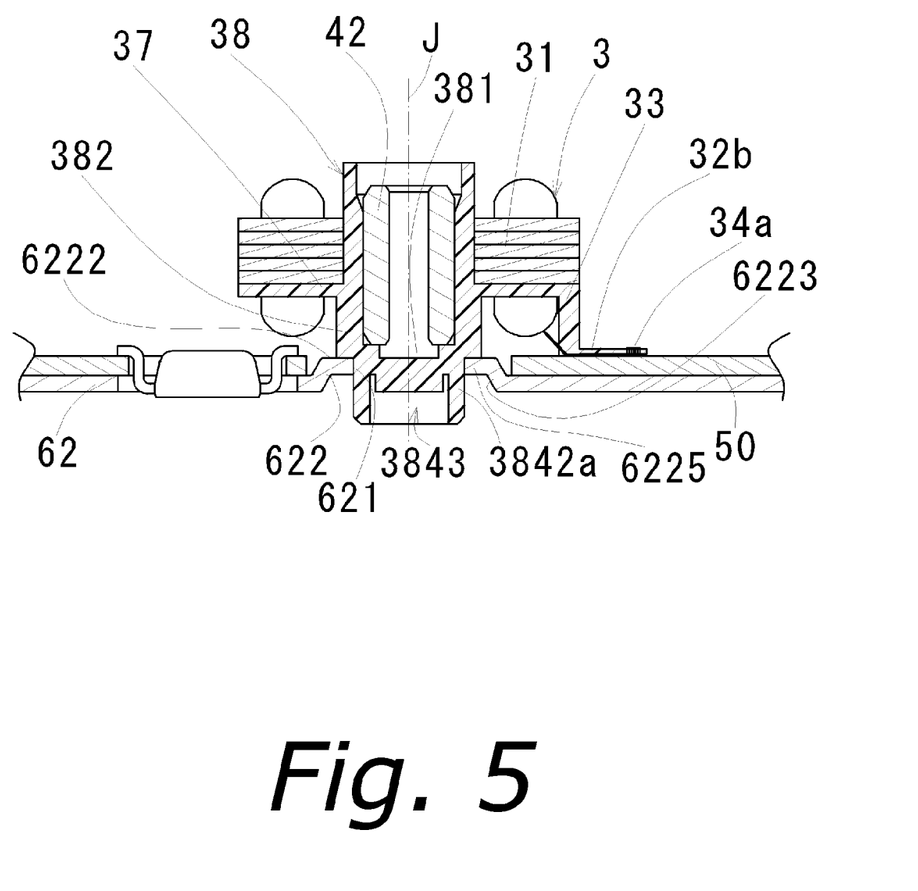
FIG. 5 is a schematic cross-sectional view of a motor according to a second preferred embodiment of the present invention during a manufacturing process thereof.

FIG. 5 is a schematic partial cross-sectional view illustrating a method of fixing a stator portion 3 to a base 62 according to a second preferred embodiment of the present invention. The structure of a centrifugal fan according to the second preferred embodiment is substantially similar to that of the centrifugal fan 100 according to the first preferred embodiment except in the structures of terminal pins 32b and a tubular portion 3842a. The other components of the centrifugal fan according to the second preferred embodiment are assigned the same reference numerals as those of their counterparts in the first preferred embodiment.

The tubular portion 3842a, which defines a portion of the bottom portion of the bearing housing 38, preferably includes a groove defined along the periphery of the hole portion 3843. The groove contributes to preventing the resin of the tubular portion 3842a from flowing into the hole portion 3843, which is positioned axially below the bearing mechanism 4, during the operation for the thermal caulking using the heating jig. The bearing mechanism 4 is accordingly not affected by the thermal caulking operation.

In the second preferred embodiment, each terminal pin 32b is preferably made of a resin, and hence may be called a "resin projection". Each terminal pin 32b and the corresponding support portion 33 are preferably molded of the same material in one piece. More preferably, the terminal pins 32b, the support portions 33, the joining portion 37, and the bearing housing 38 are molded of the same material in one piece. The resin used is preferably a liquid crystal polymer, for example. The liquid crystal polymer has an excellent heat resisting property which makes it possible to securely bind the end portion 34a of the lead wire directly around each terminal pin 32b, and solder the terminal pin 32b to the corresponding land portion on the circuit board 50. Use of a common resin, instead of a liquid crystal polymer, would permit the heat applied during the soldering operation to cause a deformation of the terminal pin 32b. Because the terminal pin 32b preferably is made of a liquid crystal polymer in the present preferred embodiment, the heat applied during the soldering operation is unlikely to cause a deformation of the terminal pin 32b. Use of the terminal pins 32b, made of a liquid crystal polymer, therefore makes it possible to reduce the number of components as compared to when terminal pins made of a metal are used, for example. Moreover, the terminal pins 32b can be shaped with high precision because the terminal pins 32b are molded integrally in one piece with the bearing housing 38 and so on.

While preferred embodiments of the present invention have been described above, the foregoing description thereof is merely illustrative of the present invention and is not intended to limit the scope of the present invention. It is to be understood that variations and modifications are possible. For example, in each of the above-described preferred embodiments, an oil-impregnated bearing defined by a sleeve is preferably used as a component of the bearing mechanism of the motor. Note, however, that the bearing mechanism of the motor may be a bearing mechanism using a ball bearing in other preferred embodiments of the present invention. Also, the motor according to each of the above-described preferred embodiments is preferably used as a driving source for a centrifugal fan. Note, however, that the motor may be used as a driving source for an axial fan, or may be used for other purposes than driving a fan, in other preferred embodiments of the present invention.

Also, in each of the above-described preferred embodiments, the support portions 33, the joining portion 37, and the bearing housing 38 are preferably molded of the same material in one piece. Note, however, that it may be so arranged that only the support portions 33 and the joining portion 37 are molded in one piece of the same material, such as a resin, and that the support portions 33 and the joining portion 37 defined in one piece are fitted to the bearing housing 38 made of a resin, in other preferred embodiments of the present invention. Also, the hole portion 3843 of the tubular portion 3842 or 3842a according to each of the above-described preferred embodiments includes a bottom and is substantially cylindrical in shape. Note, however, that the substantially cylindrical shape of the hole portion 3843 is not essential to the present invention, and that the hole portion 3843 may be in the shape of a rhombus, a cross, or the like, in other preferred embodiments of the present invention. Also, in each of the above-described preferred embodiments, the inside bottom portion of the tubular portion 3842 or 3842a is preferably arranged to be substantially flush with the lower surface of the lower flat portion 6221. Note, however, that the inside bottom portion of the tubular portion 3842 or 3842a may be positioned higher in the axial direction than the lower surface of the lower flat portion 6221, in other preferred embodiments of the present invention. Also, the liquid crystal polymer is used as a resin material in each of the above-described preferred embodiments. Note, however, that the use of the liquid crystal polymer is not essential to the present invention, and that any resin material meeting the above-described requirements may be used in other preferred embodiments of the present invention. Also, in each of the above-described preferred embodiments, the bearing housing 38 is fixed to the base 62 preferably through thermal caulking applied to the entire circumference of the tubular portion 3842 or 3842a, so as to define the second large diameter portion 384. Note, however, that the thermal caulking may be applied to only several circumferential positions spaced from each other, instead of across the entire circumference, in other preferred embodiments of the present invention.

What is claimed is:

1. A motor comprising:
   a shaft including a central axis in a center thereof and arranged to extend in a vertical direction;
   a hub arranged to be supported by the shaft and provided substantially in a shape of a covered cylinder;
   a magnet attached to an inside of the hub;
   a stator arranged radially opposite the magnet;
   a bearing mechanism including the shaft and a sleeve arranged to rotatably support the shaft;
   a bearing housing arranged to accommodate the bearing mechanism, the bearing housing including a bottom portion and being substantially cylindrical, the bottom portion of the bearing housing including a first large diameter portion, a small diameter portion, and a second large diameter portion;
   a base arranged near the bottom portion of the bearing housing, and including a base hole defined therein; and
   a circuit board arranged on an upper surface of the base; wherein
   the bearing housing is made of a resin material;
   the first large diameter portion is arranged on the upper surface of the base;
   an outer circumferential surface of the small diameter portion is arranged radially opposite a side peripheral surface of the base hole;

the second large diameter portion is arranged to be in direct contact with a lower surface of the base through caulking;
both of the first and second large diameter portions are in direct surface-to-surface contact with the base; and
the circuit board is arranged radially outward from both of the first and second large diameter portions such that no portion of the circuit board is axially overlapped by either of the first and second large diameter portions.

2. The motor according to claim 1, wherein
the base includes a protruding portion arranged to extend axially upward around a periphery of the base hole to protrude above a remaining portion of the base; and
the second large diameter portion of the bearing housing is arranged in contact with a lower surface of the protruding portion.

3. The motor according to claim 2, wherein
the bearing housing includes a shaft receiving surface defined at an inside bottom portion thereof; and
the shaft receiving surface is arranged axially above the lower surface of the protruding portion.

4. The motor according to claim 2, wherein the second large diameter portion of the bearing housing is arranged in contact with the entire lower surface of the protruding portion.

5. The motor according to claim 1, wherein the resin material is a liquid crystal polymer.

6. The motor according to claim 1, wherein the base is made of metal.

7. The motor according to claim 1, wherein the base is held securely between a lower surface of the first large diameter portion and an upper surface of the second large diameter portion of the bearing housing.

8. A blower fan comprising:
the motor of claim 1; and
an impeller attached to an outside of the hub, and arranged to rotate about the central axis to produce a flow of air.

9. A motor, comprising:
a shaft including a central axis in a center thereof and arranged to extend in a vertical direction;
a hub arranged to be supported by the shaft and provided substantially in a shape of a covered cylinder;
a magnet attached to an inside of the hub;
a stator arranged radially opposite the magnet, the stator includes:
   a stator core including a core back and teeth;
   a plurality of terminal pins; and
   a plurality of support portions each arranged to support a separate one of the terminal pins;
a bearing mechanism including the shaft and a sleeve arranged to rotatably support the shaft;
a bearing housing arranged to accommodate the bearing mechanism, the bearing housing including a bottom portion and being substantially cylindrical, the bottom portion of the bearing housing including a first large diameter portion, a small diameter portion, and a second large diameter portion;
a base arranged near the bottom portion of the bearing housing, and including a base hole defined therein; and
a circuit board arranged on an upper surface of the base; wherein
the bearing housing is made of a resin material;
the first large diameter portion is arranged on the upper surface of the base;
an outer circumferential surface of the small diameter portion is arranged radially opposite a side peripheral surface of the base hole;
the second large diameter portion is arranged to be in direct contact with a lower surface of the base through caulking; and
the support portions and the bearing housing are integral with each other.

10. The motor according to claim 9, wherein
each of the support portions and the corresponding one of the terminal pins are molded together;
each of the teeth includes a lead wire wound therearound to define a coil;
end portions of the lead wires are electrically connected to the terminal pins; and
the terminal pins are electrically connected to the circuit board.

11. The motor according to claim 9, wherein
each of the support portions and the corresponding one of the terminal pins are outsert molded to one another;
each of the teeth includes a lead wire wound therearound to define a coil;
end portions of the lead wires are electrically connected to the terminal pins; and
the terminal pins are electrically connected to the circuit board.

12. The motor according to claim 9, wherein
the base includes a protruding portion arranged to extend axially upward around a periphery of the base hole to protrude above a remaining portion of the base; and
the second large diameter portion of the bearing housing is arranged in contact with a lower surface of the protruding portion.

13. The motor according to claim 9, wherein the resin material is a liquid crystal polymer.

14. The motor according to claim 9, wherein the base is made of metal.

15. The motor according to claim 9, wherein the base is held securely between a lower surface of the first large diameter portion and an upper surface of the second large diameter portion of the bearing housing.

16. A blower fan comprising:
the motor of claim 9; and
an impeller attached to an outside of the hub, and arranged to rotate about the central axis to produce a flow of air.

17. A motor, comprising:
a shaft including a central axis in a center thereof and arranged to extend in a vertical direction;
a hub arranged to be supported by the shaft and provided substantially in a shape of a covered cylinder;
a magnet attached to an inside of the hub;
a stator arranged radially opposite the magnet, the stator includes:
   a stator core including a core back and teeth, each of the teeth including a lead wire wound therearound to define a coil;
   a plurality of resin projections around which end portions of the lead wires are provided; and
   a plurality of support portions each arranged to support a separate one of the resin projections;
a bearing mechanism including the shaft and a sleeve arranged to rotatably support the shaft;
a bearing housing arranged to accommodate the bearing mechanism, the bearing housing including a bottom portion and being substantially cylindrical, the bottom portion of the bearing housing including a first large diameter portion, a small diameter portion, and a second large diameter portion;
a base arranged near the bottom portion of the bearing housing, and including a base hole defined therein; and a circuit board arranged on an upper surface of the base; wherein the bearing housing is made of a resin material;

the first large diameter portion is arranged on the upper surface of the base;

an outer circumferential surface of the small diameter portion is arranged radially opposite a side peripheral surface of the base hole;

the second large diameter portion is arranged to be in direct contact with a lower surface of the base through caulking; and the resin projections and the support portions are integral with the bearing housing.

18. The motor according to claim 17, wherein the base includes a protruding portion arranged to extend axially upward around a periphery of the base hole to protrude above a remaining portion of the base; and the second large diameter portion of the bearing housing is arranged in contact with a lower surface of the protruding portion.

19. The motor according to claim 17, wherein the base is made of metal.

20. A blower fan comprising:

the motor of claim 17; and an impeller attached to an outside of the hub, and arranged to rotate about the central axis to produce a flow of air.

* * * * *